(12) United States Patent
Howe-Veenstra et al.

(10) Patent No.: US 9,540,005 B1
(45) Date of Patent: Jan. 10, 2017

(54) AIRCRAFT SYSTEMS AND METHODS WITH MULTIPLE SAP SPEED PROFILES

(71) Applicant: HONEYWELL INTERNATIONAL INC., Morris Plains, NJ (US)

(72) Inventors: Ryan Howe-Veenstra, Plymouth, MN (US); Benjamin Bochem, Peoria, AZ (US); Mike Jackson, Maple Grove, MN (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 15/082,494

(22) Filed: Mar. 28, 2016

(51) Int. Cl.
*B60W 30/14* (2006.01)
*G01C 21/34* (2006.01)

(52) U.S. Cl.
CPC ............ *B60W 30/143* (2013.01); *G01C 21/34* (2013.01)

(58) Field of Classification Search
CPC .............................. B60W 30/143; G01C 21/34
USPC .......................................................... 701/93
See application file for complete search history.

(56) References Cited

U.S. PATENT DOCUMENTS

| | | | |
|---|---|---|---|
| 6,507,782 B1 | 1/2003 | Rumbo et al. | |
| 8,010,267 B2 | 8/2011 | Klooster et al. | |
| 8,150,565 B2 | 4/2012 | Wachenheim et al. | |
| 8,150,588 B2 | 4/2012 | Klooster | |
| 8,244,466 B2 | 8/2012 | DeJonge et al. | |
| 8,340,843 B2 | 12/2012 | Coulmeau et al. | |
| 8,386,097 B2 | 2/2013 | de Menorval et al. | |
| 8,386,174 B2 | 2/2013 | Coulmeau et al. | |
| 8,406,939 B2 | 3/2013 | Jackson et al. | |
| 8,688,363 B2 | 4/2014 | Svoboda et al. | |
| 8,788,189 B2 | 7/2014 | Polansky et al. | |
| 8,983,683 B2 | 3/2015 | Tino et al. | |
| 2008/0243314 A1* | 10/2008 | Ridenour | G08G 5/0008 701/7 |
| 2011/0107797 A1* | 5/2011 | Inoue | C03B 37/01413 65/377 |
| 2011/0118908 A1* | 5/2011 | Boorman | G08G 5/0021 701/14 |

(Continued)

OTHER PUBLICATIONS

Prats, X. et al.; Evaluation of In-Flight Trajectory Optimisation With Time Constraints in a Moving Base Flight Simulator; 34th Digital Avionics Systems Conference Sep. 13-17, 2015.

(Continued)

*Primary Examiner* — McDieunel Marc
*Assistant Examiner* — James E Stroud
(74) *Attorney, Agent, or Firm* — Lorenz & Kopf, LLP

(57) ABSTRACT

A method is provided for controlling speed of a vehicle. The method includes determining an arrival time error (ATE) for a required time of arrival (RTA) and a projected trajectory according to a travel plan with a current speed profile having a plurality of regions, each with a respective speed adjustment parameter (SAP) and a respective SAP value relative to a nominal speed profile. The method further includes selecting, when the ATE is greater than a threshold, one of the regions as a selected region for modification based on a priority order of the regions. The method further includes modifying the current speed profile by adjusting the respective SAP value for the selected region according to the respective SAP in order to decrease the ATE; and implementing the modified speed profile.

20 Claims, 4 Drawing Sheets

(56) References Cited

U.S. PATENT DOCUMENTS

| | | | | |
|---|---|---|---|---|
| 2011/0270470 | A1* | 11/2011 | Svoboda | G05D 1/0607 |
| | | | | 701/3 |
| 2012/0041627 | A1* | 2/2012 | Kelty | B60L 11/1862 |
| | | | | 701/22 |
| 2013/0110316 | A1* | 5/2013 | Ogawa | G08G 1/096716 |
| | | | | 701/1 |
| 2014/0088799 | A1* | 3/2014 | Tino | G06Q 10/047 |
| | | | | 701/3 |
| 2015/0277441 | A1 | 10/2015 | Garrido-Lopez | |
| 2016/0069688 | A1* | 3/2016 | Polansky | G05D 1/0005 |
| | | | | 701/3 |

OTHER PUBLICATIONS

Rieck, M. et al.; Optimal Trajectories for RPAS with Discrete Controls and Discrete Constraints; 2014 IEEE International Conference on Aerospace Electronics and Remote Sensing Technology (ICARES).

\* cited by examiner

AIRCRAFT SYSTEMS AND METHODS WITH MULTIPLE SAP SPEED PROFILES

TECHNICAL FIELD

The present invention generally relates to aircraft systems and methods, and more particularly relates to the systems and methods for controlling the speed of an aircraft in view of a required time of arrival.

BACKGROUND

Commercial aircraft make extensive use of systems to plan and execute flights, control the aircraft, and manage a number of other aircraft operations. For example, such systems may include a flight management system (FMS) that generates flight plans with lateral segments and vertical segments to a destination. The flight plans may include details about the appropriate speeds, altitudes, and location in the various modes of a flight, and the FMS determines the most effective mechanisms for complying with these parameters.

Some modern air traffic systems also include a timing requirement such that the aircraft is expected to be at a designated altitude and location at a particular time. Given the already complex considerations of flight planning, as well as the uncertainty associated with implementing such planning, conventional aircraft systems may find the timing or other accuracy requirements to be challenging.

Accordingly, it is desirable to provide improved systems and methods for controlling the flight of an aircraft, particularly with respect to time constraints. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a method is provided for controlling speed of a vehicle. The method includes determining an arrival time error (ATE) for a required time of arrival (RTA) and a projected trajectory according to a travel plan with a current speed profile having a plurality of regions, each with a respective speed adjustment parameter (SAP) and a respective SAP value relative to a nominal speed profile. The method further includes selecting, when the ATE is greater than a threshold, one of the regions as a selected region for modification based on a priority order of the regions. The method further includes modifying the current speed profile by adjusting the respective SAP value for the selected region according to the respective SAP in order to decrease the ATE; and implementing the modified speed profile.

In accordance with another exemplary embodiment, a method is provided for controlling speed of a vehicle. The method includes determining an arrival time error (ATE) for a required time of arrival (RTA) and a projected trajectory according to a travel plan with a current speed profile having a plurality of regions, each with a respective speed adjustment parameter (SAP) and a respective SAP value relative to a nominal speed profile; sequentially selecting and modifying, when the ATE is greater than a threshold, the respective SAP values of individual regions of the plurality of regions based on a priority order of the regions to generate modified speed profiles; and implementing the modified speed profiles. The priority order is high to low when decreasing a magnitude of the respective SAP value and low to high when increasing the magnitude of the respective SAP value.

In accordance with a further exemplary embodiment, a system is provided for controlling speed of a vehicle. The system includes a navigation system configured to generate navigation information; and a guidance system coupled to the navigation system and configured to generate actuator commands for the vehicle based on the navigation information in accordance with a travel plan. The travel plan has a current speed profile with a plurality of regions to a fix point with a Required Time of Arrival (RTA), each of the regions having a respective speed adjustment parameter (SAP) and a respective SAP value relative to a nominal speed profile. The guidance system includes an RTA module configured to determine an arrival time error (ATE) for a projected trajectory according to the current speed profile; and to sequentially select and modify, when the ATE is greater than a threshold, the respective SAP values of individual regions of the plurality of regions based on a priority order of the regions to generate modified speed profiles as the current speed profile implemented by the guidance system. The priority order of the RTA module is high to low when decreasing a magnitude of the respective SAP value and low to high when increasing the magnitude of the respective SAP value.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Broadly, exemplary embodiments discussed herein include aircraft systems and methods for controlling an aircraft during flight. Particularly, the system and methods are applicable to an aircraft flying to a fix, such as a reference position with a timing constraint, such as a required time of arrival (RTA). In one exemplary embodiment, the systems and methods consider a flight plan with a speed profile divided into regions, each of which may be individually adjusted with a respective speed adjustment parameter (SAP). The regions may be prioritized for adjustment to optimize compliance with the RTA.

Figure 1:
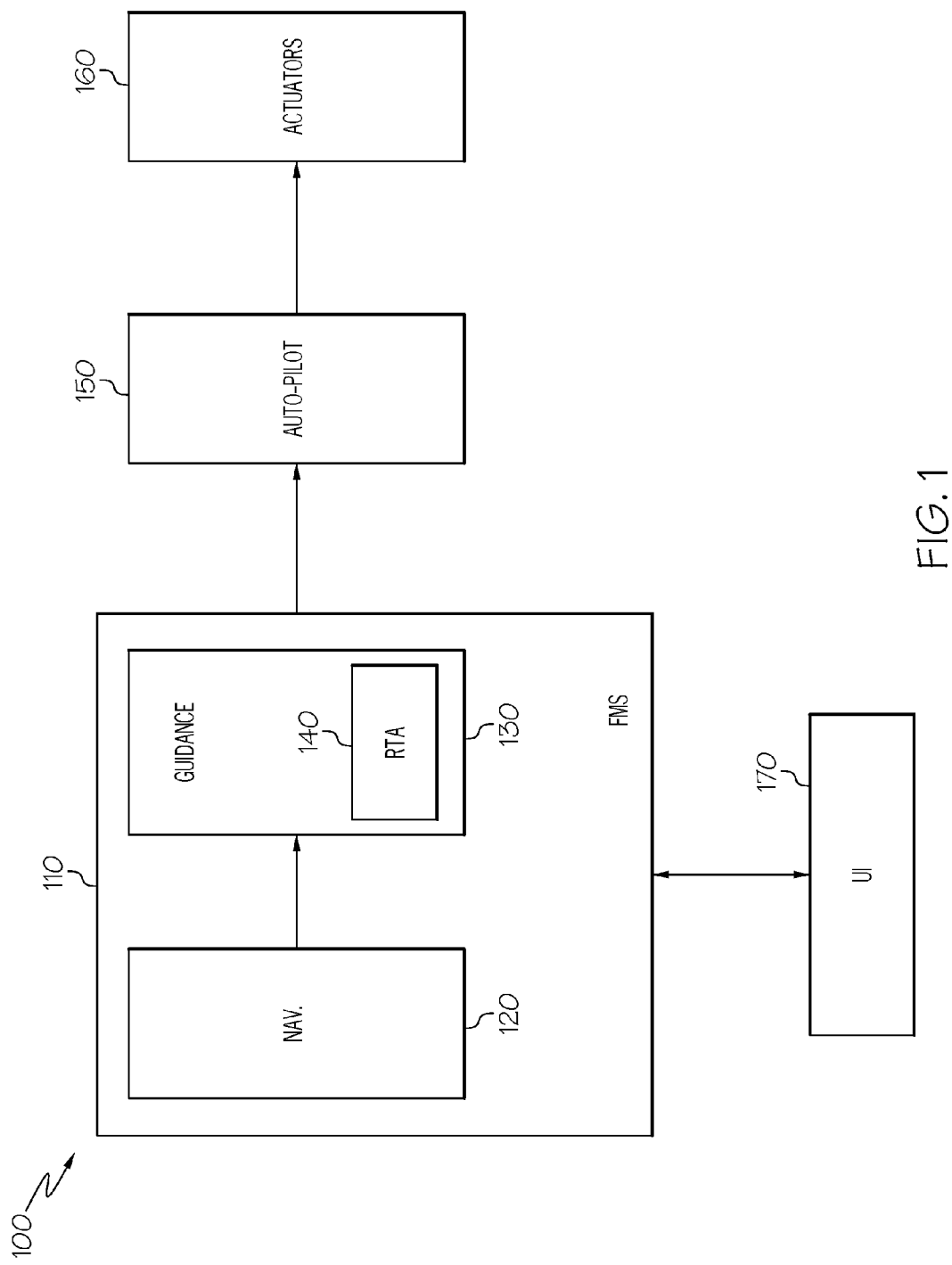
FIG. 1 is a block diagram of an aircraft system for controlling the flight of the aircraft in accordance with an exemplary embodiment.

FIG. 1 is a schematic block diagram of an aircraft system 100 for controlling the flight of an aircraft in accordance with an exemplary embodiment. In the illustrated embodiment, the aircraft system 100 includes a flight management system (FMS) 110, an auto-pilot system 150, aircraft actuators 160, and a user interface 170. As described in greater detail below, the FMS 110 includes a navigation system 120 and a guidance system 130 with an RTA module 140.

Notably, it should be understood that although system 100 appears in FIG. 1 to be arranged as an integrated system, the exemplary embodiments are not so limited and can also include an arrangement whereby one or more of the components are separate components or subcomponents of another system located either onboard or external to an aircraft. For example, the auto-pilot system 150 may be incorporated into the FMS 110. Furthermore, even though the description below primarily references "aircraft" for efficiency, the systems and methods are not limited to aircraft and can also be implemented in other types of vehicles, including cars, trucks, ships, submarines, spacecraft, or unmanned vehicles. Generally, exemplary embodiments may apply to any type of vehicle that involves mission or trip planning with timing constraints. The components of the system 100 are introduced below prior to a more detailed description of components and operation of the RTA module 140.

The FMS 110 generally performs a wide variety of in-flight tasks during operation of the aircraft, including navigation and guidance of the aircraft respectively implemented by the navigation system 120 and the guidance system 130. Although not specifically shown, the FMS 110, including the navigation system 120 and guidance system 130, may be implemented with one or more computer processors, such as for example, a microprocessor or digital signal processor capable of performing the functions discussed herein. The FMS 110 may further include a database with any elements necessary for the operation of the aircraft and the creation and implementation of a flight plan, including waypoints, airports, terrain information and applicable flight rules.

In general, the navigation system 120 determines the current kinematic state of the aircraft. As such, in the exemplary embodiment, the navigation system 120 includes any suitable position and direction determination devices, such as an inertial reference system (IRS), an air-data heading reference system (AHRS), radio navigation aids, or a global navigation satellite system (GNSS). For example, the navigation system 120 provides at least the current position and velocity of the aircraft to the guidance system 130. Other navigation information may include the current heading, current course, current track, altitude, pitch, and any desired flight information.

In general, the guidance system 130 uses various flight and engine models and algorithms to construct lateral and vertical profiles for various segments that make up a flight plan based on navigation information received from the navigation system 120 (e.g., the current position and velocity) and inputs from the pilot or other source (e.g., the desired destination or fix). As examples, the guidance system 130 may generate the flight plan based on considerations for timing, position, altitude, speed targets, and fuel economy. The guidance system 130 may also consider aircraft-specific parameters such as weight, fuel, and atmospheric conditions. In one scenario, aspects of the flight plan may be dictated by Air Traffic Control (ATC) or the Federal Aviation Administration (FAA) rules. As noted above, the system 100 is applicable to any type of vehicle such that the term "travel plan" generically refers to a flight plan of an aircraft or corresponding types of plans for non-aircraft vehicles.

The flight plan may include a number of segments or regions between waypoints, each of which have an associated position, altitude, speed, and time that the aircraft is scheduled to fly. As such, the guidance system 130 generally constructs and/or modifies flight plan segments from a first state (e.g., a current or future location, altitude, speed and/or time) to a second state (e.g., a subsequent location, altitude, speed, and/or time). In one exemplary embodiment, the flight plan includes one or more altitude profiles and speed profiles. The altitude profile is typically expressed as altitude with respect to distance to provide an indication about the appropriate altitude for a given location, e.g., at distances from a waypoint, reference position, fix, or destination. The speed profile is typically expressed as a series of speed targets for the aircraft at given times and/or distances, as discussed in greater detail below.

Figure 2:
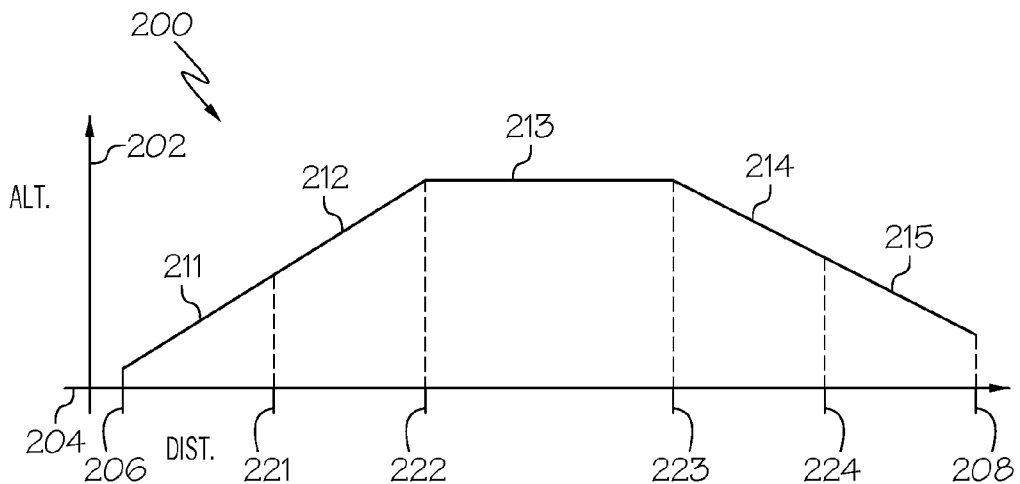
FIG. 2 is an exemplary altitude profile of a flight plan implemented by the system of FIG. 1 in accordance with an exemplary embodiment.
Figure 3:
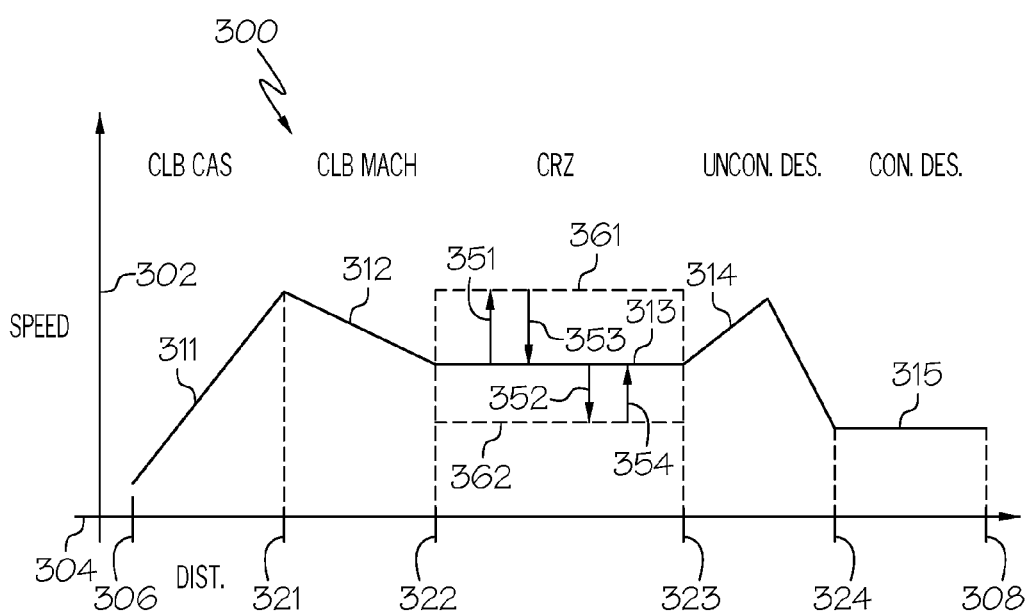
FIG. 3 is an exemplary speed profile of a flight plan implemented by the system of FIG. 1 in accordance with an exemplary embodiment.

The RTA module 140 forms part of the guidance system 130 and particularly functions to generate and/or modify the speed profile of the flight plan based on timing constraints, such as a time constraint fix. The RTA module 140 functions as a full phase RTA system that enables speed control throughout the entire flight. As described in greater detail below, FIGS. 2 and 3 are exemplary altitude and speed profiles 200 and 300 that may be generated or implemented by the guidance system 130 and that are used to describe the RTA module 140.

Returning to FIG. 1, the guidance system 130 provides the flight plan in the form of guidance commands to the auto-pilot system 150. For example, the commands generated by the guidance system 130 associated with the flight plan may include pitch commands, pitch rate commands, roll commands, and speed targets that function to implement the lateral and vertical profiles.

In response to receiving the guidance commands, the auto-pilot system 150 generates actuator commands that function to control the flight characteristics of the aircraft via the actuators 160. As examples, the actuator commands generated by the auto-pilot system 150 may include one of more of elevator commands, aileron commands, rudder commands, throttle commands, and speed brake commands to achieve the speed target of the flight plan.

The actuators 160 collectively include one or more aircraft components that, when controllably positioned, guide the movement of the aircraft, including the flight surfaces and associated drive components. As described above, the position of the actuators 160 are controlled by the commands of the auto-pilot system 150 or by commands from the pilot via the user interface 170. The number and type of actuators 160 included in an aircraft may vary. As examples, the actuators 160 may include elevators for adjusting the pitch of the aircraft, ailerons for adjusting the roll of the aircraft, and a rudder for adjusting the yaw of the aircraft respectively controlled according to the elevator commands, aileron commands, and rudder commands from the auto-pilot system 150 or from the pilot. The actuators 160 further include a throttle that adjusts the speed of the aircraft by respectively increasing or decreasing power to the engine according to the throttle commands from the auto-pilot system 150 or the pilot.

The system 100 additionally includes the user interface 170. The pilot or flight crew may initiate and modify the flight plan or flight commands of the guidance system 130 via the user interface 170. The user interface 170 may include any suitable hardware and software components that enable the pilot to interface with the system 100. Such components may include keyboards, mouse devices, buttons, switches, levers, and knobs. The user interface 170 may include a display unit capable of displaying various types of computer generated symbols and information, such as various CRT or flat panel display systems, such as LCDs, OLED displays, projection displays, plasma displays, HDDs, HUDs, and the like. The user interface 170 may be part of a multifunctional display unit, such as a primary flight display or mode control unit.

As noted above, the system 100, particularly the RTA module 140, operates to assist the aircraft in meeting a time restraint at the fix by flying the appropriately created and modified flight plan. The flight profile, including the altitude and speed profile components, may be defined in any suitable manner. In one exemplary embodiment, the flight profile may be divided into regions or segments. Any mechanism, even arbitrary mechanisms, may be used to define the regions, as long as the collective regions extend continuously between the origin and fix. In one exemplary embodiment, the regions may be based on a combination of flight phase and speed characteristics. The regions may be defined by a user or operator, the airline, manufacturer, or other party. In some instances, a set of defined regions may be provided, e.g., by a manufacturer such that an operator may choose a desired set of defined regions for implementation. As described in greater detail below, each region may be individually evaluated and appropriately adjusted to meet the overall time constraint.

Typically, an initial flight plan is generated with a nominal speed profile with regions that may be subsequently adjusted in accordance with respective speed adjustment parameters (SAP). Each SAP may be considered a collection of characteristics that define the manner in which one or more regions of the speed profile are adjusted (e.g., increased or decreased, as well as subsequent adjustments). The respective SAP may be defined in a different manner for each region to enable individual adjustments in respective regions. A SAP may be considered to have a value, either a positive value, negative value, or zero, and may be adjusted in increments referred to as "SAP adjustments." Generally, a positive SAP value indicates that the region is being adjusted by increasing the speed in the respective portion of the speed profile; a negative SAP value indicates that the region is being adjusted by decreasing the speed in the respective portion of the speed profile; and a zero SAP value indicates that the respective portion of the speed profile is not being adjusted. Additionally, the SAP values may have maximum and minimum limits. In the nominal speed profile, each region has a SAP of zero, and as conditions change, the SAP value of each region may be adjusted up and down as described in greater detail below. Additionally, the regions are prioritized with respect to adjustments. The region with the highest priority corresponds to the region that the RTA module 140 attempts to minimize adjustments relative to the nominal speed profile, while the remaining regions are prioritized with decreasing importance with respect to the potential adjustments. As described in greater detail below, the priority of the regions impacts the adjustments from two perspectives: increasing the magnitude of SAP value and decreasing the magnitude of the SAP value. As such, the selection and sequence of adjustments based on the priority order may be a low to high sequence or a high to low sequence, depending on the nature of the adjustments, the ATE, and/or the respective SAP values.

Examples of the altitude and speed profiles generated by the guidance system 130 to provide optimized control of the aircraft are described below in greater detail in FIGS. 2 and 3. FIG. 2 is a simplified altitude profile 200 of a flight plan generated by the guidance system 130 of FIG. 1 in accordance with an exemplary embodiment. As an example, FIG. 2 illustrates the altitude profile 200 for an aircraft flying from an initial or designated location to a time constraint or RTA fix 208. In one exemplary embodiment, the fix 208 is a position prior to a destination, runway, or other reference point. Altitude is indicated on the vertical axis 202 and distance is indicated on the horizontal axis 204. As noted above, the altitude profile 200 generally indicates the altitude that the aircraft should fly relative to the distance from the fix 208. In the portion illustrated in the depicted embodiment, the altitude profile 200 includes five regions 211-215 extending from location 206, to/from reference points 221-224, and to fix 208 along the profile 200. The altitude profile 200 may include pitch angles, roll angles, and pitch rates of change set by the pilot or the auto-pilot system 150 (FIG. 1) for implementation of the flight plan. The depicted altitude profile 200 is merely an example, and any type of altitude profile characteristic may be provided. Additional details about the regions 211-215 that make up the profile 200 are discussed below with reference to the speed profile 300 of FIG. 3.

FIG. 3 is a speed profile 300 that generally corresponds to the altitude profile 200 of FIG. 2. The speed profile 300 represents a series of speed targets that are provided to the auto-pilot system 150 to produce throttle commands that attempt to achieve those speed targets. In FIG. 3, speed is represented on the vertical axis 302 and time is represented on the horizontal axis 304. Similar to the altitude profile 200, the speed profile 300 includes speed targets for each region 311-315, which correspond in distance and time to the regions 211-215 of the altitude profile 200 of FIG. 2. Although not shown in FIG. 3, the speed profile 300 may incorporate a speed margin, a thrust margin, and other parameters that may be used to implement a speed profile.

Any suitable speed profile 300 may be provided, but in the depicted embodiment, the speed profile includes a first region 311 with increasing speed targets, a second region 312 with decreasing speed targets, a third region 313 with constant speed targets, a fourth region 314 with increasing and decreasing speed targets, and a fifth region 315 with constant speed targets. As noted above, the regions 311-315 may be defined relative to one another in any manner, although in the depicted embodiment the regions 311-315 correspond to speed and phase characteristics. In particular, the regions 311-315 may be respectively labeled as the Climb CAS, Climb MACH, Cruise, Unconstrained Descent, and Constrained Descent. Such regions 311-315 may be further subdivided and/or rearranged based on the desired number of regions for consideration in meeting the timing constraint, as described below.

Typically, the aircraft is attempts to meet a timing constraint or required time of arrival (RTA) at the fix 308. As introduced above, each region 311-315 may be adjusted with respect to a SAP to meet the RTA. Each region 311-315 may be adjusted separately with individual evaluation and individual SAP characteristics. For clarity, the third region 313 has been annotated to illustrate the nature of one example of adjustment. As noted above, the speed profile region 313 may be adjusted in accordance with SAP increments that collectively result in SAP values. Arrow 351 refers to a SAP adjustment that increases from zero or a positive SAP value; arrow 352 refers to a SAP adjustment that decreases from zero or a negative SAP value; arrow 353 refers to a SAP adjustment that decreases from a positive SAP value; and arrow 354 refers to a SAP adjustment that increases from a negative SAP value. As such, each SAP adjustment 351, 352 increases the magnitude of the SAP value, and each SAP adjustment 353, 354 decreases the magnitude of the SAP value. The SAP characteristics depicted for region 313 further include a maximum SAP value 361 and a minimum SAP value 362 that represent the limits of SAP adjustment. Such limits may be the result of applicable speed envelopes for aircraft operation or any other limit such as operator entry or from a procedure out of the navigation database. Additional details about modifying the SAP values will be provided below.

As also introduced above, the regions 311-315 may be prioritized for adjustment with respect to increasing and decreasing the magnitudes of SAP values. Any prioritization may be designated to reflect the relative importance of potential adjustments to the overall flight plan, such as where adjustments may be difficult or inefficient, the modifications should be minimized relative to other regions. As one example, the speed profile may be prioritized as follows in order of decreasing importance (e.g., from high priority to low priority): 1) Climb CAS region 311; 2) Climb MACH region 312; 3) Constrained Descent region 315; 4) Unconstrained Descent region 314; and 5) Cruise region 313. The prioritization of regions may be defined in any suitable manner. In one exemplary embodiment, the prioritization is established by the operator, while in other embodiments, the prioritization may be defined by the manufacturer, airline, or other party.

Figure 4:
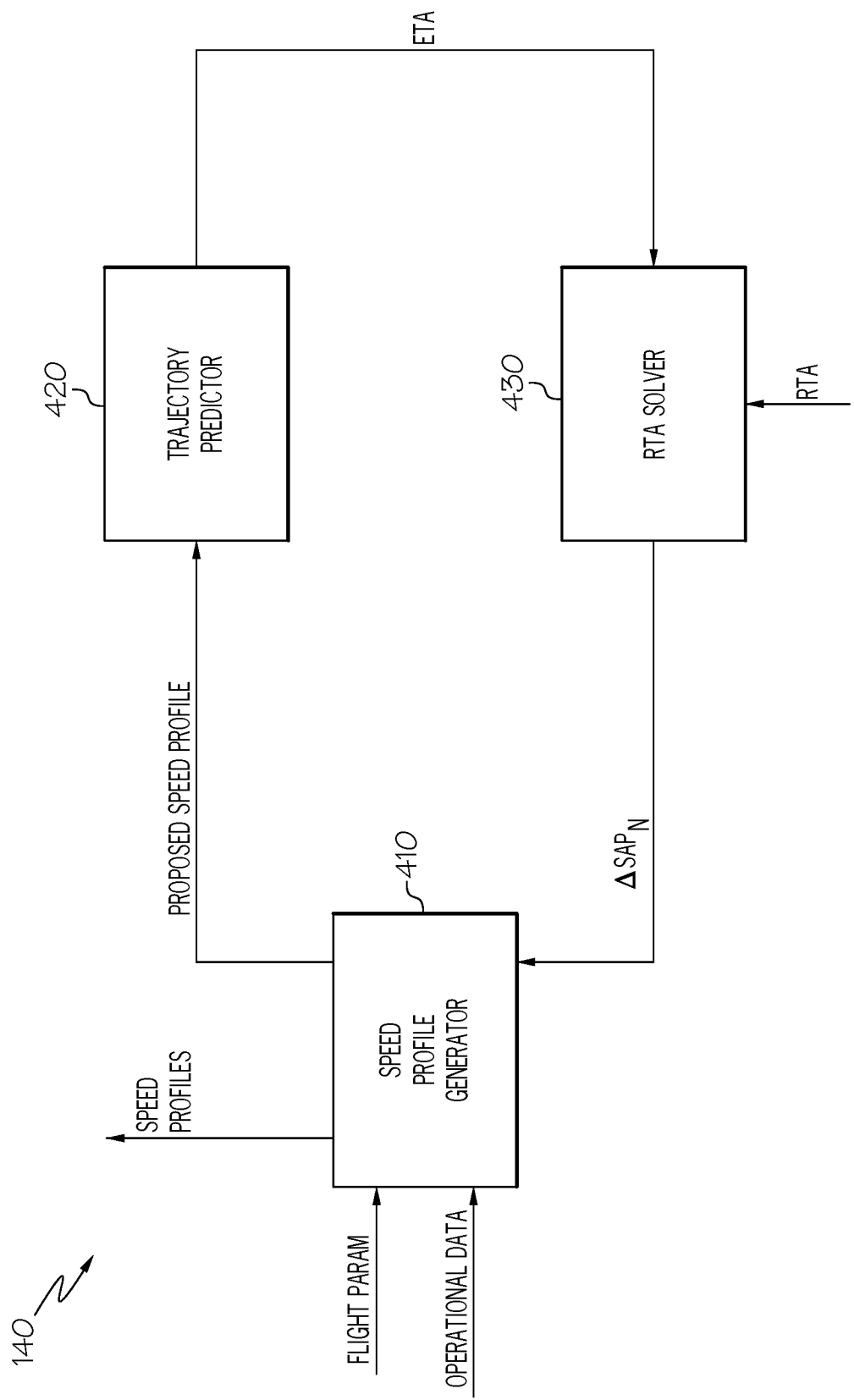
FIG. 4 is a block diagram of a required time of arrival (RTA) module of the system of FIG. 1 in accordance with an exemplary embodiment.

FIG. 4 is a more detailed view of the RTA module 140 of the guidance system 130 for constructing and adjusting the speed profile of the aircraft. In general, the RTA module 140 assists the guidance system 130 (FIG. 1) in constructing flight plan segments from a first state (e.g., a current or future location, altitude, speed and/or time) to a second state (e.g., a subsequent location, altitude, speed, and/or time). The RTA module 140 is described with respect to a number of units or sub-modules 410, 420, and 430 (e.g., software, hardware, or combinations thereof). Specifically, each of the units 410, 420, and 430 may be implemented to carry out specific functions. Accordingly, these units 410, 420, and 430 may include processing units that execute machine instructions or algorithms stored in the database or local memory and retrieved and executed to perform the functions discussed herein. FIG. 4 depicts one exemplary organization, although other embodiments may perform similar functions with alternative organization or implementation.

As depicted, the RTA module 140 includes a speed profile generator 410, a trajectory predictor 420, and an RTA solver 430. Initially, the speed profile generator 410 calculates or receives a nominal speed profile based on flight parameters (e.g., the origin, destination, fix, conditions, etc.) provided by various portions of the FMS 110. The speed profile generated by the speed profile generator 410 may include characteristics similar to those discussed above with reference to FIG. 3. As examples, each speed profile may include the defined regions and SAP characteristics, as well as any speed restrictions or parameters typically associated with the speed profile. As such, the speed profile generator 410 may generate the speed targets for each defined region. The speed profile generator 410 may provide the speed targets of the speed profile to the auto-pilot system 150 (FIG. 1).

Further to the nominal speed profile, the RTA module 140 functions to continuously update the speed targets of the speed profile to provide a more predictable and accurate coordination of speed, altitude, location, and times, particularly with respect to an RTA at a fix. In one exemplary embodiment, this may be an iterative process in which the speed profile generator 410, the trajectory predictor 420, and the RTA solver 430 exchange information to arrive at an updated speed profile that meets the RTA. An introduction of this process is provided below prior to a more detailed description with reference to FIG. 5.

The speed profile generator 410 provides the speed profile to the trajectory predictor 420. The trajectory predictor 420 predicts the trajectory that the aircraft will fly according to the speed profile provided by the speed profile generator 410. Additionally, the trajectory predictor 420 estimates the time of arrival (ETA) at the fix based on the current speed profile, flight parameters, operational data, and any other relevant information.

The RTA solver 430 receives the ETA of the projected trajectory segment related to the RTA fix and considers the ETA relative to the RTA. The RTA may be provided by the operator (e.g., via a user interface 170), air traffic control, or other source. The RTA solver 430 compares the ETA to the RTA to calculate an arrival time error (ATE). If the ATE is zero or less than a predetermined threshold, the RTA solver 430 does not adjust the speed profile and the current speed profile is maintained. If the ATE is greater than the predetermined threshold in either a positive or negative direction (e.g., early or late), the RTA solver 430 evaluates a speed adjustment.

In particular, the RTA solver 430 calculates a change in SAP value to modify the speed profile in one or more regions. As discussed below, the regions are prioritized for individual adjustments based on various parameters in an attempt to reduce the ATE. In the case of individual adjustment of regions, the order of the regions considered for adjustment may depend on whether the ATE is such that the SAP adjustment is increasing or decreasing the magnitude of the SAP values. Using the example of the profile 300 of FIG. 3, when the conditions (e.g., based on ATE, current adjustments, or other parameters) are such that an increase in magnitude is necessary, the RTA solver 430 will generally attempt to modify the SAP value in the lowest priority region (Cruise region 313); and if the lowest priority region is unavailable for adjustment, then the next lowest priority region (Unconstrained Descent region 314) is considered for adjustment, and so on, depending on respective region limits and other considerations. Similarly, when the conditions are such that a decrease in magnitude is necessary, the RTA solver 430 will generally attempt to modify the SAP value in the highest priority region (Climb CAS region 311); and subsequently, if further adjustments are warranted, then the next highest priority region (Climb MACH region 312) is considered for adjustment, and so on, depending on respective region limits and other considerations.

Typically, the SAP adjustments are made in increments, and the speed profile generator 410 may determine the resulting speed profile of the SAP adjustments as a proposed modified profile. The proposed modified profile may be provided to the trajectory predictor 420 to calculate the ETA, which is provided to the RTA solver 430 for evaluation of the resulting ATE. The process is generally repeated until the ATE reaches an acceptable threshold and the proposed modified speed profile is implemented by the RTA module 140 as commands to the auto-pilot system 150.

During flight, the RTA module 140 continues to update the speed targets in an iterative process as conditions change. For example, the trajectory predictor 420 continues to generate predicted trajectories based on the current state of the aircraft, and if the RTA solver 430 determines that a projected trajectory will not satisfy the RTA requirements, the RTA module 140 continues to adjust the speed profile to meet these requirements, as will be discussed in greater detail below.

Figure 5:
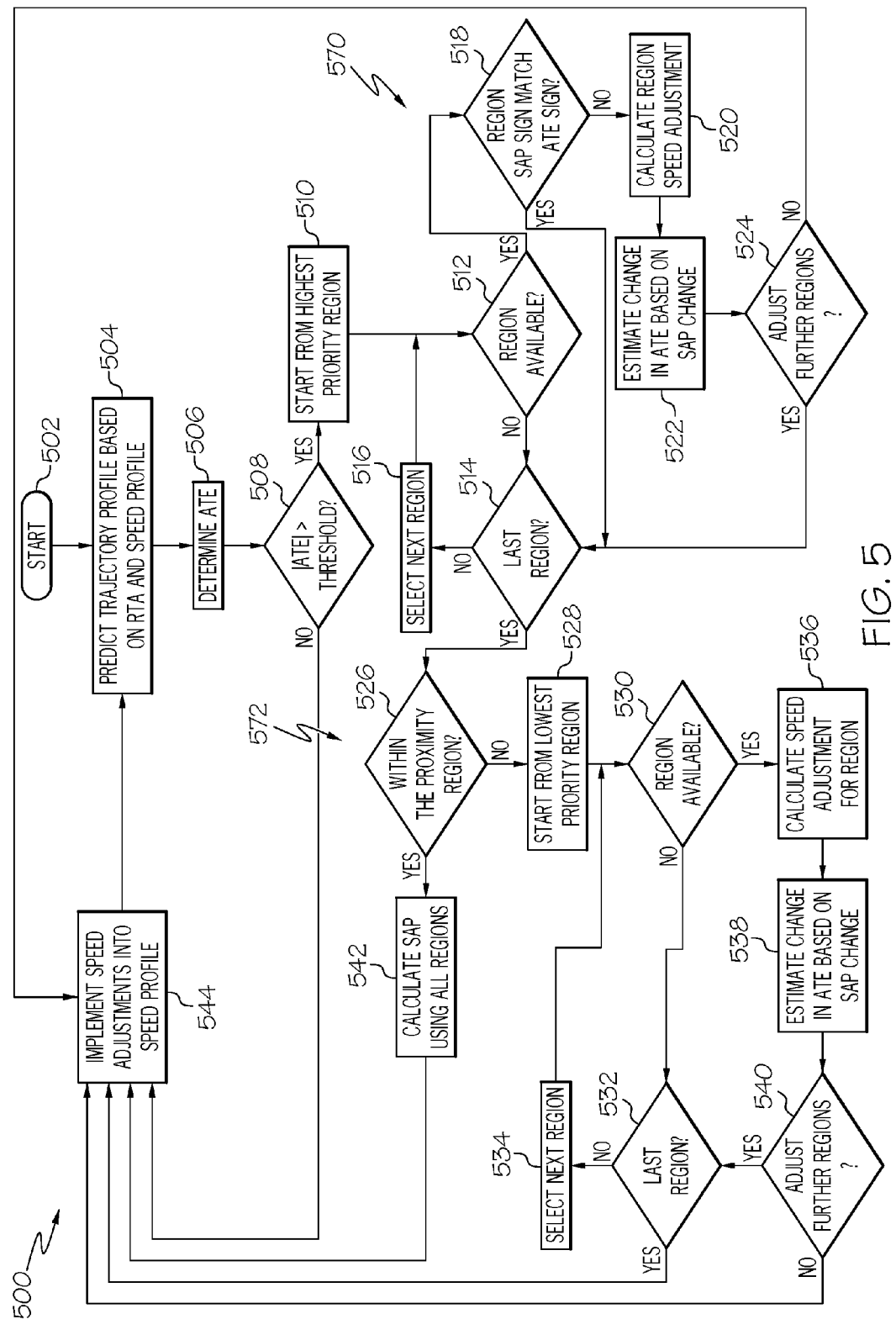
FIG. 5 is a flowchart of a method for generating a speed profile that achieves an RTA in accordance with an exemplary embodiment.

FIG. 5 is a flowchart of a method 500 for controlling the speed of an aircraft in accordance with an exemplary embodiment. As an example, the method 500 may be implemented with the system 100 of FIG. 1 and RTA module 140 of FIG. 4. As such, FIGS. 1 and 4 will be referenced below. Reference is also made to the speed profile 300 of FIG. 3. Although the steps 502-546 are depicted as separate steps, at least some of the steps may be combined, rearranged, or omitted.

As preliminary steps 502, which may be considered part of the method 500 or part of the preparation for implementing the method 500, the RTA module 140 receives or generates a speed profile of a flight plan from an origin to a fix with a designated RTA. The speed profile includes one or more of the following characteristics: a number defined regions, the characteristics of the SAP for each region, and a prioritization of the regions. Initially, the speed profile may be considered a nominal speed profile. Moreover, the RTA module 140 may check for any updates regarding, for example, flight conditions or updated RTAs. Such updates may be particularly relevant or applicable during flight.

In a step 504, the RTA module 140 calculates a predicted trajectory profile based on the speed profile.

In step 506, the RTA module 140 determines the estimated time of arrival (ETA) in view of the speed profile and calculates an arrival time error (ATE) by comparing the ETA to the RTA. In some exemplary embodiments, the predicted trajectory profile, ATE, and ETA may be calculated in any suitable manner, including by modules or systems external to the RTA module 140. Generally, the RTA module 140 determines at least the ATE (e.g., the RTA module 140 calculates the ATE or receives the ATE from another processing module or source). In further embodiment, the ETA may not be determined (e.g., the ATE may be derived from the RTA without specifically calculating the ETA).

In step 508, the RTA module 140 evaluates the magnitude of the ATE by comparing the magnitude of the ATE to a threshold value. If the ATE is zero or within a predetermined threshold or margin, the aircraft is considered to be on schedule and the method 500 returns to step 504 until a changing condition results in an unacceptable ATE. If the ATE is greater than a threshold (e.g., either ahead of schedule or behind schedule), the method 500 proceeds to step 510.

Generally, in the description below, the steps 510, 512, 514, 516, 518, 520, 522, 524, and 526 may be considered a first sub-loop 570 of the method 500. In the depicted embodiment of the method 500, the first sub-loop 570 evaluates if and how the SAP values of the speed profile should be decreased in magnitude. A subsequent sub-loop 572 is described below for evaluating if and how the SAP values of the speed profile should be increased in magnitude.

In step 510, the RTA module 140 selects the highest priority region for consideration and possible adjustment. As such, initially, the highest priority region is selected, although as described below, other regions may also be considered in subsequent iterations.

In step 512, the RTA module 140 determines if the selected region is available for adjustment. Generally, the term "available" refers to a region that has been designated as being eligible for RTA control, while the term "unavailable" refers to a region that is not subject to RTA control. For example, a region may be unavailable if the region has already been flown by the aircraft or is scheduled to be flown after the RTA fix. In some instances, a region between the aircraft and the RTA fix may be unavailable as being reserved for some other purpose, such as a speed mode. In other instances, a region may be unavailable because the region has been omitted or is not a part of the present flight plan, such as in the case of a "Wilkinson sword" in which there is no cruise portion or if there are no speed constraints defined in the descent flight phase such that there will be no descent constrained region. These availability rules or protocols may be defined in the RTA module 140. In any event, the RTA module 140 determines if the currently considered region is available or unavailable for RTA control. If the current region is unavailable, the method 500 proceeds to step 514. If the current region is available, the method 500 proceeds to step 518.

In step 514, the RTA module 140 evaluates the current region to determine if the current region is the last region. In this context, the last region would be the region of lowest priority. If the current region is the last region, the method 500 proceeds to step 528, discussed below. If the current region is not the last region, the method 500 proceeds to step 516.

In step 516, the RTA module 140 selects the next region for consideration and designates the next region as the new current region. In this context, the next region would be the region of next highest priority from the current region. For example, if the current region (e.g., from step 510) is the highest priority region, the next region would be the next highest priority region, and so on. Upon selection of the new current region, the method 500 returns to step 512 until the current region is considered available (e.g., in step 512) or there are no further regions (e.g., in step 514). As a result of steps 510-516, the current region under consideration may be considered the highest available prospective region (e.g., because at this point, no adjustments in this region have occurred for this iteration of the method 500).

As noted above, if the current region is available in step 512, the method 500 proceeds to step 518 in which the current SAP value for the current region is evaluated relative to the ATE. In particular, the signs (e.g., positive or negative) of the current SAP value for the current region and the ATE are compared. As noted above, the sub-loop 570 is generally applicable to decreases in the magnitude of the SAP values, and if the signs of the current SAP value for the current region and the ATE are different, it typically indicates that a decrease in magnitude is necessary, and vice versa. As such, if the sign of the ATE is the same as the sign of the SAP value for the current region, the method 500 proceeds to step 514. If the sign of the ATE is different than the sign of the SAP value for the current region, the method 500 proceeds to step 520.

In step 520, an adjustment in the current SAP value for the current region is calculated. Generally, the SAP value may be adjusted in any suitable manner. In one exemplary embodiment, the SAP value may be iteratively and incrementally adjusted in dependence on various parameters, including applicable SAP maximum and minimums, sensitivity of the ATE to the speed profile, accumulated time error, and the like. The result of step 520 is a SAP adjustment for the current region. In one exemplary embodiment, the SAP value may be adjusted according to the description in U.S. Pat. No. 6,507,782, which is incorporated herein by reference.

From step 520, the method 500 proceeds to step 522 in which the RTA module 140 determines the change in ATE based on the SAP adjustment from step 520. In one exemplary embodiment, the RTA module 140 may estimate the change in ATE by estimating a new trajectory based on the resulting adjusted speed profile and computing a new ATE based on the newly computed ETA. In other embodiments, the RTA module 140 may estimate the change in ATE in another manner, such as based on already available estimations, calculations, and data, without estimating a new trajectory and ETA estimate. In any event, in step 522, the method 500 determines the manner in which the adjustment in SAP changes the ATE, and the method proceeds to step 524.

In step 524, the RTA module 140 determines if adjustments to the SAP value of further regions are necessary or otherwise warranted. This determination may take a number of forms and be based on various parameters and conditions. If the RTA module 140 determines that no further regions should be adjusted at this time, the method 500 proceeds to step 544 and the present adjustments are implemented into the speed profile, and subsequently to step 504 to repeat the method 500. Exemplary embodiments of step 524 are discussed below. The exemplary embodiments of step 524 may be individually implemented as alternatives or two or more collectively implemented in combination.

In one exemplary embodiment, the determination of step 524 may be based on the SAP value of the current region relative to the impact of the adjustment on ATE. In particular, the SAP adjustment from step 520 should contribute to an improvement in ATE from step 522. As such, in one embodiment of step 524, the ATE remaining after adjustments may be compared to a threshold. If the remaining ATE is less than a predetermined threshold, the adjustments are considered to have sufficiently reduced the ATE to an acceptable level, and the method 500 proceeds to step 544 for implementation of the SAP adjustments. In this embodiment, if the remaining ATE from step 524 is still larger than the threshold, the method 500 may proceed to step 514 for potentially more adjustments.

In another exemplary embodiment, the determination of step 524 may be based on the SAP value of the current region relative to the nominal speed profile for the current region. As noted above, in sub-loop 570, the SAP values of the speed profile are decreased in magnitude, and the method 500 generally attempts to decrease the magnitudes of the SAP values to zero such that the resulting speed targets of the respective region match the nominal speed profile in the relative higher priority regions prior to considering decreasing the magnitudes of SAP values in other regions. As such, in this example, if the SAP value for the current region is not zero (e.g., at a nominal speed profile for the current region), the method 500 proceeds to step 544 to implement the current adjustments. Upon completion of step 544, a further iteration of the method 500 may consider further decreases in magnitude for the current region. However, if the SAP value for the current region is zero in step 524, the method proceeds to step 514, as described above for the possible selection and modification of other available regions with lower priority.

In a further exemplary embodiment, the RTA module 140 may evaluate the change in ATE with respect to a sign change for the ATE (e.g., if the ATE change results in a positive ATE value from a negative ATE value, results in a negative ATE value from a positive ATE value, or no change). In this embodiment, if the sign of the ATE is changed, the method 500 proceeds to step 544 in which the SAP adjustments for the current region are incorporated into the speed profile. In this embodiment, when the SAP adjustment for the current region does not change the sign of the ATE, the method 500 proceeds to step 514 for potentially more adjustments of other available regions with lower priority.

Other conditions and parameters may also be considered in step 524. For example, the sensitivity of the aircraft to throttle movements required to meet modified speed targets may impact the number or size of adjustments within a particular iteration of the method 500.

As noted above, in step 514, the RTA module 140 determines if the current region is the last region. If not, the method 500 proceeds to step 516 and the next region is selected for consideration of more adjustments, as discussed above. If the current region is the last region, the method 500 proceeds to step 526. As a result of step 514, in cooperation with the steps above, the method 500 sequentially considers, selects, and modifies, as appropriate, the available regions in order of high to low priority until no further regions are available or until further modifications are no longer appropriate.

In step 526, the RTA module 140 determines if the aircraft is within the RTA proximity. In one exemplary embodiment, RTA proximity is defined as a position from the fix in which the speed profiles of individual regions are no longer adjusted, and RTA proximity may be expressed as a distance or time remaining to the RTA fix. In other embodiments, and more generally, RTA proximity is defined as any condition that, when satisfied, indicates that an individual region may be overly sensitive to speed adjustments, and as a result may establish a scenario in which simultaneous SAP adjustments across all regions are advantageous. Exemplary consideration of such a scenario may be when only two regions are remaining as available or when the aircraft sequences into a specific flight phase, as examples.

If the aircraft is within the RTA proximity, the method 500 proceeds to step 542. In step 542, the RTA module 140 calculates an SAP adjustment applicable across all available regions. As in step 520, the SAP value may be adjusted in any suitable manner, except that in step 542, the adjustments are made across all available regions. As such, in one exemplary embodiment, the SAP values may be iteratively and incrementally adjusted in dependence on various parameters, including applicable SAP maximum and minimums, sensitivity of the ATE to the speed profile accumulated time error, and the like. In one exemplary embodiment, the SAP values may be adjusted according to the description in U.S. Pat. No. 6,507,782. After step 542, the method 500 proceeds to step 544 in which the appropriate adjustments to SAP values are implemented.

If, in step 526, the aircraft is not in a proximity region, the method 500 proceeds to step 528 in which a current region is selected. In step 528, the region with the lowest priority is designated as the current region.

In step 530, the RTA module 140 determines if the current region is available for adjustment, similar to the consideration of availability in step 512. If the current region is unavailable, the method 500 proceeds to step 532. If the current region is available, the method 500 proceeds to step 536.

In step 532, the RTA module 140 evaluates the current region to determine if the current region is the last region. In this context, the last region would be the region of highest priority. If the current region is the last region, the method 500 proceeds to step 544 in which any current adjustments in SAP values from previous steps of the method 500 are implemented into the speed profile. If the current region is not the last region, the method 500 proceeds to step 534.

In step 534, the RTA module 140 selects the next region for consideration and designates the next region as the new current region. In this context, the next region would be the region of next lowest priority from the current region. Upon selection of the new current region, the method 500 returns to step 530 until the current region is considered available (e.g., in step 530) or there are no further regions (e.g., in step 532).

Prior to step 536, the current region under consideration may be considered the lowest available prospective region. In step 536, an adjustment in the current SAP value for the current region is calculated. Similar to step 520, the SAP value may be adjusted in any suitable manner in an attempt to reduce the ATE. In one exemplary embodiment, the SAP value may be iteratively and incrementally adjusted in dependence on various parameters, including applicable SAP maximum and minimums, sensitivity of the ATE to the speed profile, accumulated time error, and the like. The result of step 536 is an SAP adjustment for the current region. In one exemplary embodiment, the SAP value may be adjusted according to the description in U.S. Pat. No. 6,507,782, which is incorporated herein by reference.

From step 536, the method 500 proceeds to step 538 in which the RTA module 140 determines the change in ATE based on the SAP adjustment from step 536. In one exemplary embodiment, the RTA module 140 may estimate the change in ATE by estimating a new trajectory based on the resulting adjusted speed profile and computing a new ATE based on the newly computed ETA. In other embodiments, the RTA module 140 may estimate the change in ATE in another manner, such as based on already available estimations, calculations, and data, without estimating a new trajectory and ETA estimate. In any event, in step 538, the method 500 determines the manner in which the adjustment in SAP changes the ATE.

From step 538, the method 500 proceeds to step 540 in which the RTA module 140 determines if adjustments to the SAP value of further regions are necessary or otherwise warranted. This determination may take a number of forms and be based on various parameters and conditions. If the RTA module 140 determines that no further regions should be adjusted at this time, the method 500 proceeds to step 544 and the present adjustments are implemented into the speed profile, and subsequently to step 504 to repeat the method 500. Generally, the RTA module 140 in step 540 may consider parameters and conditions similar to those of step 524, discussed above, although the particular parameters implemented in steps 524 and 540 may be different. As examples, the determination of step 540 may be based on whether the ATE remaining after adjustments are greater than or within an acceptable threshold and/or whether the adjustment results in a sign change of the ATE, or further considerations, as described above.

Further, in another exemplary embodiment, the determination of step 540 may be based on the SAP value of the current region relative to the nominal speed profile for the current region. As noted above, in sub-loop 572, the SAP values of the speed profile are increased in magnitude relative to the nominal speed profile. The SAP values may be subject to maximum and minimum limits. As such, the RTA module 140 may attempt to increase the magnitude of the SAP value to the maximum or minimum limit, as applicable, prior to considering an increase in the magnitudes of SAP values in other regions. As such, in this example, if the SAP value for the current region is not at the limit and further magnitude increases are warranted to meet ATE, the method 500 proceeds to step 544 to implement the current adjustments. Upon completion of step 544, a further iteration of the method 500 may consider further increases in magnitude for the current region. However, if the SAP value for the current region is at the limit in step 540, the method proceeds to step 532 to consider additional regions for adjustment, as described above. Generally, the method 500 continues to iterate during flight to continuously or periodically modify the speed profile based on changing conditions and operating parameters until arriving at the RTA fix.

Accordingly, exemplary embodiments discussed herein provide flight plans that more efficiently comply with time constraints. In particular, exemplary embodiments enable the division of the speed profile into regions that may be individually adjusted with a separate speed parameter according to a designated priority. Such regions may be sequentially adjusted, thereby enabling the retention of a margin to increase or decrease speed in prioritized regions for as much as the flight as possible, thereby improving control in achievement of the RTA.

It is important to note that while exemplary embodiments have been described in the context of a fully functioning aircraft system, exemplary embodiments are further capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for controlling speed of a vehicle, comprising the steps of: determining, with a guidance system, an arrival time error (ATE) for a required time of arrival (RTA) and a projected trajectory according to a travel plan with a current speed profile having a plurality of regions, each with a respective speed adjustment parameter (SAP) and a respective SAP value relative to a nominal speed profile; selecting, with the guidance system, when the ATE is greater than a threshold, one of the regions as a selected region for modification based on a priority order of the regions; modifying, with the guidance system, the current speed profile by adjusting the respective SAP value for the selected region according to the respective SAP in order to decrease the ATE; and implementing, with the guidance system, the modified speed profile.

2. The method of claim 1,
wherein the step of determining the ATE includes calculating the ATE by comparing an estimated time of arrival (ETA) to the RTA.

3. The method of claim 1,
wherein, prior to the implementing step, the selected region is the only one of the regions selected and modified.

4. The method of claim 1, wherein at least two of the regions of the travel plan have different SAPs.

5. The method of claim 1,
wherein the selecting step includes selecting the one of the regions as the selected region for modification in accordance with a high to low sequence of the priority order of the regions or with a low to high sequence of the priority order of the regions.

6. The method of claim 1,
wherein the modifying step includes decreasing a magnitude of the respective SAP value for the selected region or increasing the magnitude of the respective SAP value for the selected region.

7. The method of claim 6,
wherein the selecting step includes selecting the selected region as a first selected region, and wherein the method further comprises sequentially selecting and modifying at least one additional region of the regions based on the ATE and the priority order.

8. The method of claim 7,
wherein the sequentially selecting and modifying steps include
selecting the at least one additional region in accordance with a high to low sequence of the priority order when the modifying step includes decreasing the magnitude of the respective SAP value, and
selecting the at least one additional region in accordance with a low to high sequence of the priority order when the modifying step includes increasing the magnitude of the respective SAP value.

9. The method of claim 8, wherein the sequentially selecting and modifying steps include selecting a next available of the at least one additional region only when the respective SAP value of a present region is saturated.

10. The method of claim 1,
wherein the selecting step includes selecting the selected region as a first selected region, and wherein the method further comprises, prior to the implementing step,
sequentially considering a first availability of the regions in order of decreasing priority according to the priority order and designating the available region with the highest priority as a highest available prospective region, and
selecting, based on the SAP value and the ATE, the highest available prospective region as the first selected region.

11. The method of claim 10,
wherein the step of selecting the highest available prospective region includes selecting the highest available prospective region as the first selected region when the sign of the SAP value of the highest available prospective region is different than the sign of the ATE.

12. The method of claim 11, wherein the modifying step includes calculating a first speed adjustment that decreases the magnitude of the respective SAP value such that the modified speed profile in the first selected region is closer to the nominal speed profile than the current speed profile.

13. The method of claim 12, further comprising
estimating a change in the ATE based on the first speed adjustment.

14. The method of claim 13, further comprising
evaluating additional adjustments to the current speed profile, including at least one of
further adjusting the SAP value of the first selected region, or
selecting another one of the regions as a second selected region for modification based on the priority order of the regions, and modifying the current speed profile by adjusting the respective SAP value for the second selected region to decrease the ATE.

15. The method of claim 11,
wherein, when the sign of the SAP value of the highest available prospective region matches the sign of the ATE or no region in the order of decreasing priority is available, the method further comprises
sequentially considering a second availability of the regions in order of increasing priority according to the priority order and designating the available region with the lowest priority as a lowest available prospective region, and
selecting the lowest available prospective region as the first selected region.

16. The method of claim 15, wherein the modifying step includes calculating a first speed adjustment that increases the magnitude of the respective SAP value in the first selected region, and further comprising
estimating a change in the ATE based on the first speed adjustment.

17. The method of claim 16, further comprising
evaluating additional adjustments to the current speed profile, including at least one of
further adjusting the SAP value of the first selected region, or
selecting another one of the regions as a second selected region for modification based on the priority order of the regions, and modifying the current speed profile by adjusting the respective SAP value for the second selected region according to the respective SAP to decrease the ATE.

18. The method of claim 1, further comprising
evaluating a current position of the vehicle relative to a proximity region; and
modifying the SAP values across all available regions in order to decrease the ATE when the current position of the vehicle is within the proximity region.

19. A method for controlling speed of a vehicle, comprising the steps of: determining, with a guidance system, an arrival time error (ATE) for a required time of arrival (RTA) and a projected trajectory according to a travel plan with a current speed profile having a plurality of regions, each with a respective speed adjustment parameter (SAP) and a respective SAP value relative to a nominal speed profile; sequentially selecting and modifying, with the guidance system, when the ATE is greater than a threshold, the respective SAP values of individual regions of the plurality of regions based on a priority order of the regions to generate modified speed profiles, wherein the priority order is high to low when decreasing a magnitude of the respective SAP value and low to high when increasing the magnitude of the respective SAP value; and implementing, with the guidance system, the modified speed profiles.

20. A system for controlling speed of a vehicle, comprising:
- a navigation system configured to generate navigation information; and
- a guidance system coupled to the navigation system and configured to generate actuator commands for the vehicle based on the navigation information in accordance with a travel plan, the travel plan having a current speed profile with a plurality of regions to a fix point with a Required Time of Arrival (RTA), each of the regions having a respective speed adjustment parameter (SAP) and a respective SAP value relative to a nominal speed profile, wherein the guidance system includes an RTA module configured to
- determining an arrival time error (ATE) for a projected trajectory according to the current speed profile; and
- sequentially select and modify, when the ATE is greater than a threshold, the respective SAP values of individual regions of the plurality of regions based on a priority order of the regions to generate modified speed profiles as the current speed profile implemented by the guidance system, wherein the priority order of the RTA module is high to low when decreasing a magnitude of the respective SAP value and low to high when increasing the magnitude of the respective SAP value.

* * * * *